United States Patent [19]
Smith et al.

[11] Patent Number: 5,451,288
[45] Date of Patent: Sep. 19, 1995

[54] HEATED DIE PUNCH CONSTRUCTION AND CONTROL DEVICE

[76] Inventors: Larry Smith, 900 Bexley; Michael J. Horner, 25644 Elizabeth Dr., both of Perrysburg, Ohio 43551

[21] Appl. No.: 971,547

[22] Filed: Nov. 5, 1992

[51] Int. Cl.$^6$ .................. B32B 35/00; B26D 7/10; B26F 1/14; B65B 61/00
[52] U.S. Cl. .................. 156/359; 156/510; 156/513; 156/515; 53/370.7; 53/83; 83/171; 83/684; 219/490; 219/492; 219/494
[58] Field of Search .................. 83/171, 682, 684; 156/515, 251, 253, 359; 53/366, 373.7, 370.2, 370.7, 371.8, 371.9; 219/490, 492, 494

[56] References Cited
U.S. PATENT DOCUMENTS

| | | | |
|---|---|---|---|
| 2,122,368 | 6/1938 | Engler | 83/684 |
| 3,555,950 | 1/1971 | Gijsbers et al. | 83/171 |
| 3,707,102 | 12/1972 | Huppenthal et al. | 83/171 |
| 4,467,183 | 8/1984 | Ishima | 219/492 X |
| 4,506,143 | 3/1985 | Telis et al. | 219/490 X |
| 4,793,231 | 12/1988 | Brown | 83/684 |
| 4,880,481 | 11/1989 | Jerlich et al. | 148/325 |
| 5,022,295 | 6/1991 | Stemmler | 83/171 X |
| 5,081,891 | 1/1992 | Johson et al. | 83/171 X |
| 5,133,237 | 7/1992 | Daffé | 83/684 |
| 5,140,133 | 8/1992 | O'Brien et al. | 83/171 X |

*Primary Examiner*—David A. Simmons
*Assistant Examiner*—M. Curtis Mayes
*Attorney, Agent, or Firm*—Paul F. Stutz

[57] ABSTRACT

Invention discloses a heated die to form long lived aperatures in upper region of plastic wrapped packages; said die featuring improved construction providing focused unidirectional heat flow to avoid package failure leading to product deterioration and package failure and disengagement with display hangers; said heat control effected by micro control of flow of energizing electricity.

21 Claims, 5 Drawing Sheets

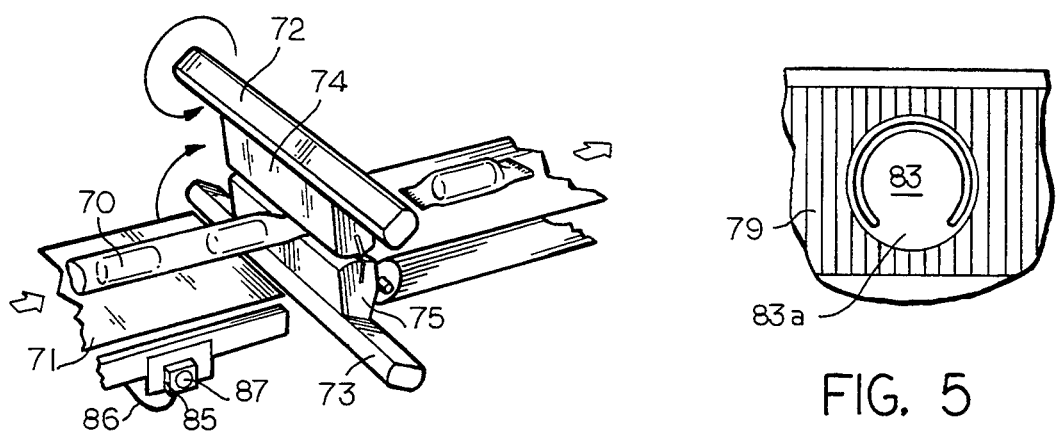
FIG. 6
FIG. 5
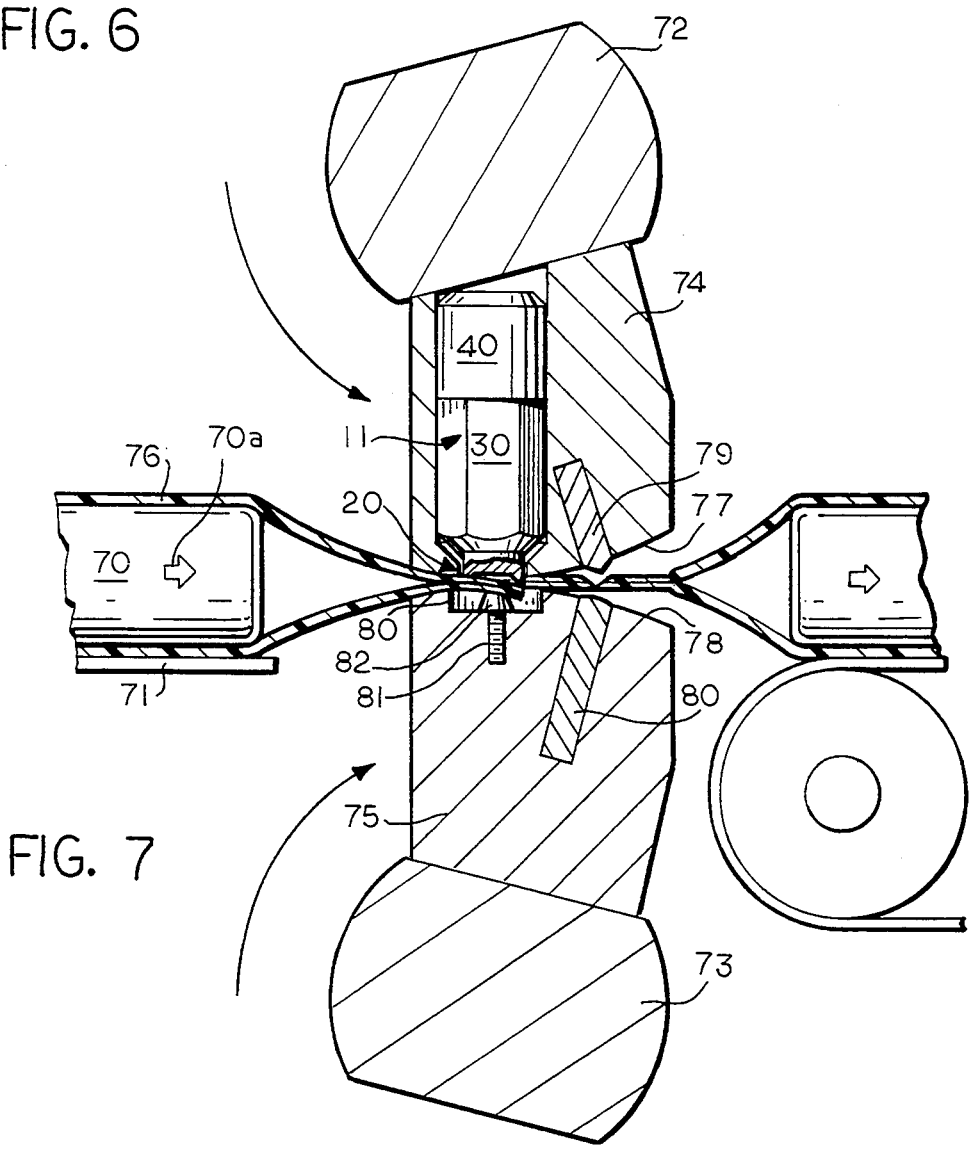
FIG. 7

HEATED DIE PUNCH CONSTRUCTION AND CONTROL DEVICE

The present invention relates to a die punch construction which employs heat and contact to form a hole or aperture in a segment of a product containing package. Precise control of the heat via a novel combination of electronic components and appropriate connecting circuitry is also within the purview of the present invention.

Thus the present invention also relates generally to the packaging art, and particularly with packages of product featuring, usually, a plastic wrap or cover which is sometimes clear to permit observation of the product. Polypropylene and modified polypropylene polymers, e.g. biaxially oriented polypropylene sheet materials are preferred package materials employed in the packages and in the invention as herein described.

Even more particularly the invention relates to such a package desireably provided with one or more apertures at the upper end of the package referred to as the "header". These serve to permit hanging or suspending a plurality of packages upon an elongate spindle, or any one of a plurality of spindles, projecting from a vertically positioned peg board type display arrangement frequently observed in retail stores of various types.

A host of products, including such disparate types as comestibles, e.g. peanuts, candies, raisins, potato chips, etc. of all types; and, as well, throw-away razors, pencils, etc. ad infinituum, are typically marketed in such packages ranging in size from extremely small, 1 or 2 items (or comestibles of several ounces) to as many as a dozen or so items (and 10 to 16 ounces for comestibles).

The outer surface of the plastic wrap usually contains decorative and printed material, including the identity of the manufacturer, the name of the product, the grade of the product, possibly a trademark, instructions, price bar code, warnings, and, as well, price. This type of product display has gained wide acceptance in drugstores, grocery stores, variety stores, hardware and department stores etc.

The packaging, as described, adapts itself to quantity display, convenient inventory, easy stocking, convenient consumer accessability for inspection and purchase, and, as well, store inventory management and control, including relocation, restocking, price changes and the like.

A down side to this type of product packaging and display resides in the fact that the aperture is frequently found not to be as strong or tough as will meet the conditions and treatment to which the package is subjected in most retail store applications/enviroment. Too frequently the aperture fails; that is, it experiences fracture or cut thru leading to an edge of the package. This destruction of aperture integrity finds the package no longer satisfactorily hung or suspended on the spindle, with the result that the package falls into contact with other suspended packages sometimes creating a trickle down effect of defective and falling packages. In any event, too frequently, one finds one or a plurality of packages landing on the first horizontial surface encountered, which may be a shelf where the package(s) gets lost; or the floor where the package (s) get stepped on and damaged, or destroyed, or it creates a hazard to the pedestrian, shoppers, employees etc. Most usually the package or packages are simply recovered as soon as possible and sorted and returned to the manufacturer as defective goods.

This requires bookkeeping credits creating accounting problems and together with the housecleaning and liability factors plus lost inventory leads to unwanted difficulty and expense and even loss of sales.

The problem is also unsightly and distracts from cleanliness, orderliness and efficiency.

In summary, it is clear that the failure of the package aperture is distasteful to the consumer, is a definite hazard and inconvenient to the retail outlet, and is a definite inconvenience to the distributor, the jobber and the manufacturer, and, of course, results in,increased cost and loss of profits, in addition to the other negative factors mentioned above.

The failure of the package aperture is frequently the result of a defect in the process or machinery employed in creating the aperture. Thus, in a hole forming operation, the outer circular edge of the die punch may acquire a nick or burr due to excess cycles, or misaligment, which translates itself into an imperfection at the edge of aperture in the "header" portion of the package. The latter can readily propagate to the edge of the package when the package is subjected to any pulling or stress in being removed and/or returned to the spindle or the like. Once the imperfection propagation reaches the edge of the package, failure occurs and the package drops off of the spindle, as described above.

Aperture failure is otherwise troublesome and undesired. Thus packages containing comestibles such as candies, potato chips, peanuts, and a host of other products and materials are desireably hermetically sealed, in order to extend the shelf life of the product and to maintain freshness, crispness, taste, avoidance of spoilage or deterioration.

The hermetically sealed character of the bag can be destroyed by propagation of a line (or zone) of weakness leading from the aperture to the interior or receptical portion of the package containing the product whereby spoilage or deterioration of comestibles occurs, etc.

Hermetic sealing is most frequently and usually accomplished by a combination product filling/packaging operation, in which product is introduced into the package and hermetically sealed by subjecting the region of package surrounding the opening to the compressive force of opposed crimping bars having facing surfaces, each of which contain a large plurality of serrations and which crimping bars may be heated. The combination of the heat, the force or pressure with which they are brought together and including the fineness and grade of tooling of the surfaces of the crimper/crimping bars, and including the grade and type and number of layers of packaging material of which the wrap is composed; all cooperate to yield a particular quality and durability of the crimp, and, of course, the quality of the hermetic seal.

In a particular packaging operation or process, the product fill is accomplished simultaneously with the formation of the package from a continous or endless roll of the appropriately selected sheet or sheets or layers of material, most usually polypropylene. The moving sheet of planer or flat configuration is gradually folded about its longitudinal axis to form a tube by overlap of the lateral edges and crimping same together, and ultimately the product-containing package is serially crimped at spaced regions on either side of the product, or contents, of the package, while at the same time severed into individual packages having crimp seals at the ends of the package. The foregoing operation is described in more detail in U.S. Pat. No. 4,807,426, dated Feb. 28, 1989.

As a practical matter, the packages of product as described hereinabove, are desireably provided with a hole or several holes in the upper region, or "header" of the package, as earlier described. It is usually most desireable to create the hole or aperture, or plurality thereof, in the packaging operation simultaneously with the crimping operation from the stand point of cost and efficiency. In order to accomplish this a die punch device is mounted in a crimper bar so that it will contact the package at the same time as the crimper bars come together. This mounting of the heated die punch in the crimper bar also create some problems which are addressed by the novel heated die punch structure and control system in accordance with the present invention.

Thus the die punching of the sheet material is most efficiently accomplished at a particular temperature which is usually higher than that necessary to achieve the crimp seal of the packages serially connected together and severed at the same time into individual packages.

The repeated heat cycle which is found necessary to achieve optimum hole formation is repeated to a degree that nominally contributes to the short life of the electrical resistance element, which is at the heart of the heated die punch of the present invention. Additionally a heated die member which is too hot will find the extra heat being transferred to the crimper region and along its length, thus resulting in zones or regions of serrations which are formed at too high a temperature resulting in an ultimate package which is not of uniform seal properties which may, and frequently does, result in deterioration, spoilage and package rejects.

The employment of a die punch operation separate from and isolated from the crimping operation while feasible, and sometime done, is usually less desireable, however for reasons including poor registration/orientation of the hole respecting the package, added steps and expense etc.

Now, as previously indicated, relatively high temperature is most desireably utilized in the creation of the hole in the "header" of the package. The temperature actually utilized will depend upon the thermal properties of the sheet material being employed in the particular packaging operation. The elevated temperatures appear to result in an annealing of the polymer in the peripheral region surrounding the hole, which region is more resistant to cut-through, as might otherwise be observed particularly with a die edge which had become worn, nicked or damaged.

Unfortunately while higher temperatures are perceived as most desireable in the foregoing and other respects; it is likewise found that the elevated temperatures contribute to the shortened life of the electric resistance element. The shorter life is further aggravated by many commercially available temperature control devices which are employed to control the flow of electricity to the heater in a random on/off cycle which is repeated to a degree that contributes to the short life of the electrical resistance element, which is at the heart of the cartridge heaters of the type commercially available.

It is also found that the elevated temperature yields a stronger peripheral region than the mechanical punch without heat. Additionally the elevated temperature welds together film layers which are, and constitute, the sheet material employed in the packaging of many products. The phenomena is also seen as eliminating stress in the region around the hole and results in reduced failure of packages in the display racks in the manner indicated hereinbefore.

PRIOR ART

Applicants are aware of three prior patents dealing with plastic sheet material and with creating holes with a heated die or punch. They are U.S. Pat. No. 2,122,368; U.S. Pat. No. 3,707,102 and U.S. Pat. No. 3,555,950. A close examination and study of the drawings and specifications in the aforesaid patents does not yield a suggestion, teaching or disclosure of the present invention, nor of the improvement contemplated in the within specification and drawings, as will become apparent from a thorough reading of the present application.

OBJECTS OF THE INVENTION

With the foregoing introduction, it may be stated that it is a general object of the present invention to provide a heated die punch for creating holes in the top region or "header" of product-containing-packages formed of plastic sheet material and desireably displayed on spindles or display rods in retail outlets of various types.

It is a particular object of the present invention to provide a novel heated die punch member which possesses features of construction which provide a number of advantages as compared to any similar structure heretofore known, including:

1. the die punch construction favors propagation of heat axially to the die or cutting end,
2. the die punch construction favors focusing of of the heat in the manner just above described, while inhibiting the flow of heat radially to such as the crimping bar in which mounted,
3. the die punch die construction is long lived to a remarkable degree as compared to any on the market today,
4. the die punch construction by reason of its desireable features creates a peripheral region around the hole which is stronger and less susceptible to fracture and cut-through, otherwise leading to package failure and packages falling off the spindles etc.
5. The heated die punch not only provides a stronger resistance to tear or fracture at the periphery of the hole in the header of the package, but at the same time ensures a crimp seal of consistent property as pertains to maintenance of hermetic conditions within the package itself, as impacts on freshness, crispness, taste etc. etc. of comestibles desireably contained in and marketed in such packages.

It is an additional object of the present invention to provide a heat control system which employs a unique combination of components and connecting circuitry design which manifests itself in achieving an incremental metering of electric current of the proper voltage and amperage to energize the electric resistance element in a continuing upward spiral, as it were, whereby thermal shock deterioration and failure is minimized to a degree heretofore not experienced. The heat control system of the invention avoids overshooting of the actual temperature desired e.g. which necessarily calls for a cooling cycle which likewise overshoots to a temperature which is too low. The cycle repeats itself detrimentally with most presently known "on/off" control devices or systems.

It is still another object of the present invention to provide a heated die punch structure and a controller device which, together and/or in combination, provide for the achievement of the optimum life expectancy of the electric resistance heater/cartridge element and enhanced consistency of maintenance of a desired level of temperature as to yield a high level of productivity or capacity of package production, all exhibiting uniform crimp seal characteristics and integrity of the periphery of the hole for obvious advantages.

It is particular abject of the present invention to provide a novel die punch construction which receives and locates a cartridge heater most opportunely for rapid consistent propagation of the heat generated thereby most efficiently to the cutting edge of the die punch element.

It is another object of the present invention to provide a die punch member, as just described, which by reason of its constructional features, including provisions for insulating/isolating the member to reduce the heat which might normally be propagated laterally or radially to the crimper region, rather than axially or longitudinally to the cutting edge.

It is yet another object of the present invention to provide such a die punch device which is, by reason of constructional features, self locking on assembly of its parts and thereafter impregnable without destroying same.

It is yet another object of the present invention to provide a die punch member which, by reason of its construction and design, inherently focuses conduction and propagation of heat axially to the die element.

It is yet another object of the present invention to provide a system for transmitting electricity to the heater cartridge nested within said die punch member-/assembly in a tailored manner as coacts with said heat focusing function as to improve the life expectancy of the heater component.

The foregoing, and, as well, other objects of the present invention, will become apparent to those skilled in the art from the following detailed description taken in conjunction with the annexed sheets of drawings.

IN THE DRAWINGS:

FIG. 5 is a plan view of a portion of a package end (the header) containing a partial, or incomplete, cut-through produced by the heated punch/die device of the present invention.

FIG. 6 is three quarter perspective view of a conventional packaging line station at which hermetic sealing crimps and the included die punch aperture are accomplished/imparted.

FIG. 7 is a side elevation view of a segment of the production line shown in FIG. 6, but sectioned and enlarged to better show the device of FIG. 1 present invention.

Figure 8:
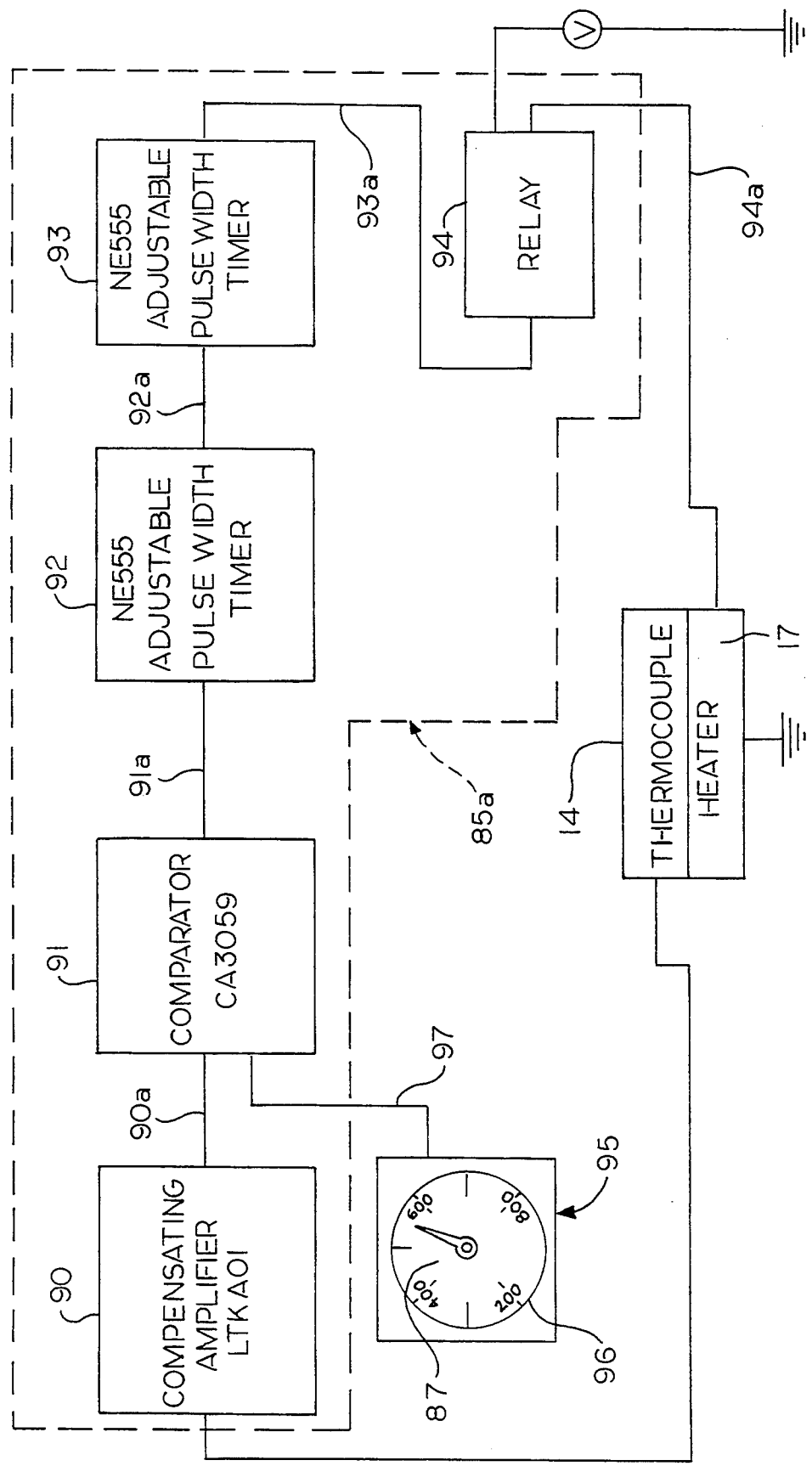

FIG. 8 is a schematic illustration of the temperature control device which is an ancillary part of the invention and which governs the incremental flow of energizing electricity to the heater component responsive to the manual temperature setting of a rheostat, and in relation to a thermocouple observed/sensed temperature, said thermocouple being proximate the heater element; and further illustrates/shows the electronic components which interelate to achieve and tailor the intermittent flow of electricity to achieve a desired rate of heating and maintenance thereof, all in accordance with a further embodiment of the present invention.

Figure 9:
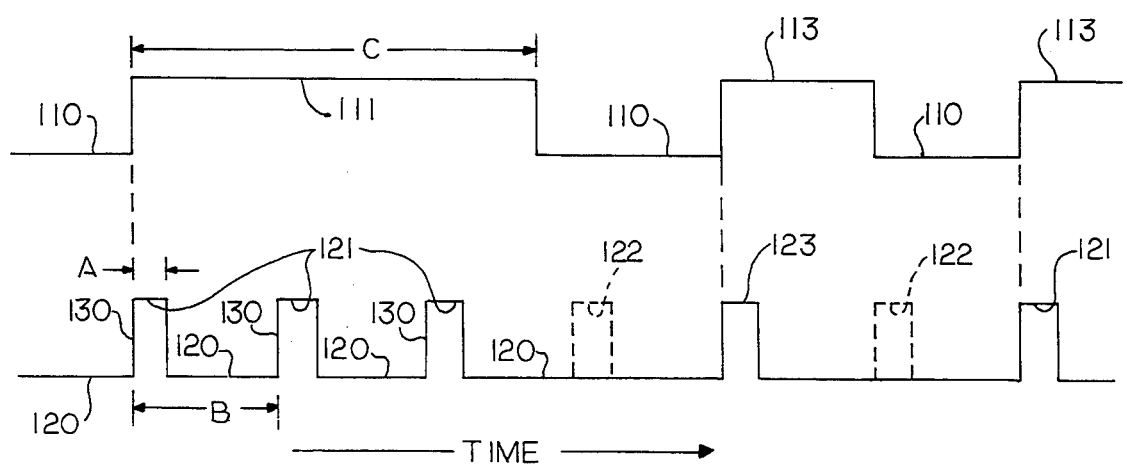

FIG. 9 is a electric current "on/off" flow diagram schematically illustrating the functioning of the electronic components, shown in FIG. 8, to achieve the optimum tailoring of the incremental flow proceeding in a cycle characterized as repeated on and off cycles; all in order to achieve a particular desired temperature without significant variance.

BRIEF DESCRIPTION OF THE INVENTION

The present invention, considered succinctly contemplates a heated die punch structure composed of a plurality of novel interfitting and uniquely interfunctional components, adapted to receive an electric resistance cartridge heater in such fashion and design, that uniquely directs the flow of heat generated by said heater in an axial direction of the die and less in other directions, for the purpose of improving the burning-/severing function of the die in its intended hole forming application and without adverse heating of surrounding areas.

Features of its construction, deemed basic and primary, include constructional design provisions for desireably directing the flow of heat, and including means for maintaining concentricity of all components in order to desireably effect the interacting objects of promoting heat flow in certain directions and inhibiting heat flow in other directions, while at the same time encouraging consistency of temperature as to enhance the hole (or partial hole) creating function of the heated die punch, all in keeping with the overall objects of the invention as enumerated hereinabove.

DETAILED DESCRIPTION OF THE INVENTION

Figure 1:
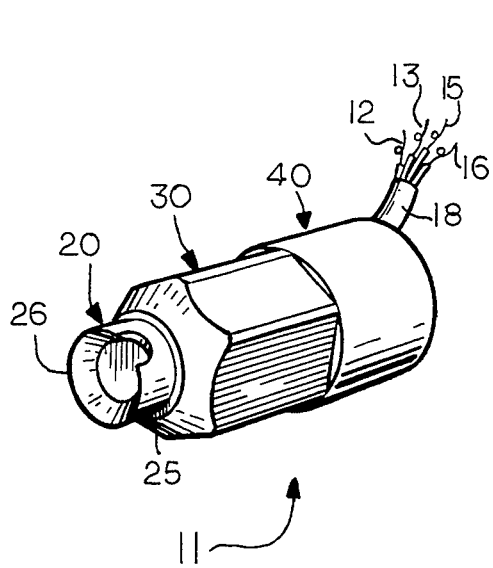
FIG. 1 is an oblique/perspective view of the die/punch device in accordance with, and constituting a principal embodiment of, the present invention containing an inner electrical heater, a control element therefor; and comprising novel features of construction which improve the heat consistency and elevation at its tip, while at the same time reducing radial heat loss.
Figure 4:
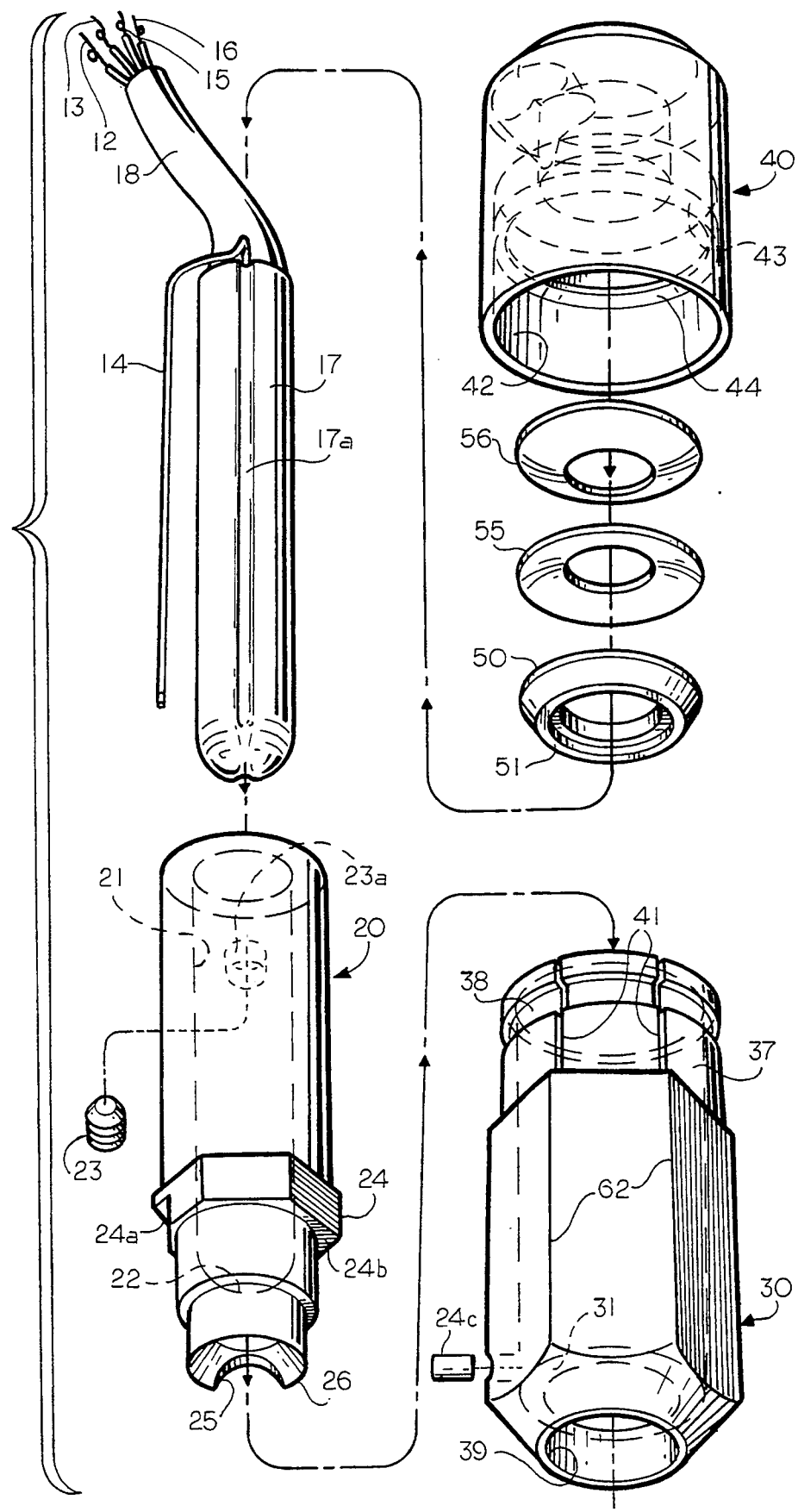
FIG. 4 is an exploded perspective view showing the individual parts of the die/punch device in mutually spaced, axial relationship, in order to better illustrate them, their spatial interrelationship and their functional integration.

Referring now more specificallly to the drawings, reference is first made to FIG. 1 which shows the fully assembled die punch assembly structure and its three (3) principal components, namely the die punch and heat sink member 20, the hollow, sleeve like, chamber member 30 and the end cap member 40. Reference numerals 12 and 13 identify electrical wires leading to thermocouple 14; while the reference numerals 15 and 16 identify electric wires leading to a tubular electrical resistance cartridge heater 17. In FIG. 4 the thermocouple 14 is shown twisted away from and out of its normal groove seat 17a proceeding longitudinally along the outer surface of cartridge electric heater 17. As can be seen the electric wires 12, 13, 15 and 16 are encased in a flexible high temperature insulator sheath 18 extending to the top of the cartridge heater 17 and for purposes of protecting the insulation wrap on each individual wire and also avoiding overheating oxidation degradation of the conductors.

Figure 2:
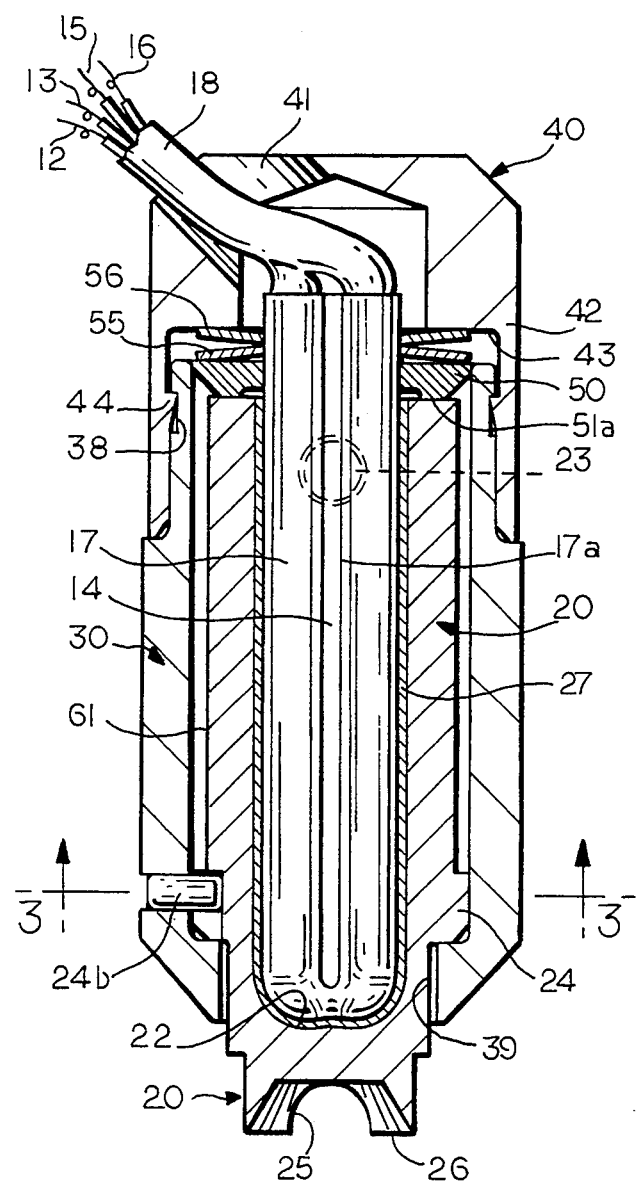
FIG. 2 is a longitudinal sectional view of the device shown in FIG. 1 and serving to illustrate the several components and their relationship to each other.
Figure 3:
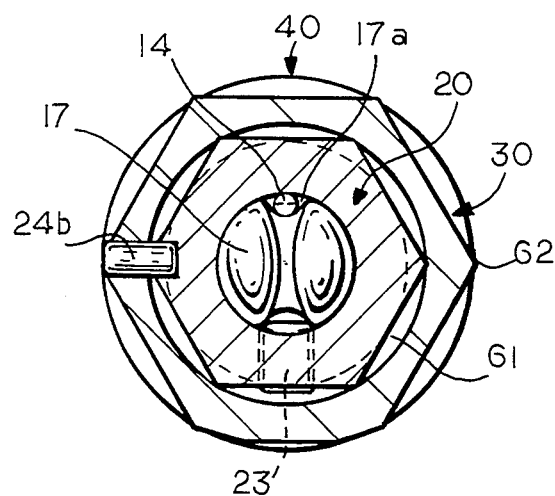
FIG. 3 is a sectional view taken on the line 3—3 in FIG. 2.

Reference to FIGS. 2, 3 and 4 together reveal that the cartridge heater 17 fits coaxially and telescopically into the axial bore 21 of the die/punch member 20 and is seated in the lower region 22. The fit of the electric cartridge heater is slidably snug to improve the heat transfer from the cartridge heater 17 to the die punch 20. The heat transfer may be maximized by use of a silver solder material 27 (FIG. 2) inserted as the electric cartidge is inserted telescopically into the axial bore 21 of the die punch member 20. The solder fills in the annualar space between the outer surface of the cartridge heater 17 and the surrounding cylindrical die punch member 20. A commerically available material marketed as Durabond and formed of an aluminum epoxy blend can sometimes be used. Set screw 23 extending through member 20 at 23a secures the relative axial position of the cartridge heater 17. Reference numeral 24 identifies a hexagonal flange extending integrally and radially from the otherwise cylindrical body of the die punch member 20. The flange 24 includes a recess 24a serving as a seat for locator pin 24c, to thereby fix the proper orientation of the cut away 25 in the otherwise circular die 26 which forms the partial holes in the sometimes clear plastic sheet material in a manner to be described. With the thermocouple 17 telescopically inserted into the bore 21 of the die punch member 20; the latter fits telescopically within the elongate open ended, hollow chamber 30. The die punch 20 is completely inserted when lower shoulder 24b of the flange 24 seats on inner shoulder 31 of the chamber 30. The chamber 30 and die 20 are twisted oppositely on their respective axis until the locator pin 24c seats on the seat or recess 24a, insuring, as indicated, proper radial orientation of the cut-out 25 and die 26 for reason to be explained.

Isolator ring 50 having inner, lower depending flange 51 (FIG. 4) and Belleville spring washers 55 and 56, telescopically surround the upper cylinder end of the cartridge heater 17 with the lower flange 51 of the isolator ring 50 resting on the top annular edge of the die punch 20, as at 51a (FIG. 2).

As shown, the lower two thirds of the member chamber 30 is hexagonal in cross section,: while the upper ⅓ identified by the reference numeral 37 is of reduced size and cylindrical to fit within the annular skirt 42 of end cap member 40, aided by six equi-spaced slots 41 in the cylindrical portion which allow limited compressibility. An inner annular shoulder 43 (FIGS. 2 and 4) defines the upper terminus of the depending skirt portion 42 of the end cap 40. The shoulder 43 rests on the uppermost Bellville spring 56 and continued downward pressure compresses the Bellville springs, 56 and 55, together until the inwardly projecting flange 44 formed on the inner surface of the skirt of cap 40, seats in an annular groove 38 formed on the outer surface of the chamber 30 (FIG. 4). The downward pressure on the end cap 40 is also translated via shoulder 43 to the outer periphery of the Bellville washers 56 and 55, and thence the isolator ring 50, which force is translated through its flange 51 to the upper annular edge of the die punch member 20, which is thusly urged downwardly through the aperture 39 in the lower end of chamber 30, so that the die 26 projects downwardly into operative hole forming relationship as seen in FIG. 2. Once the inner annular flange 44 of end cap member 40 has snapped into recess 38 of the chamber member 30; the assembly is essentially locked and the interior can no longer be accessed without destruction of the entire assembly 11. This feature is useful to preclude entry into the interior leading to damage and consequent malfunction.

In accordance with a preferred embodiment of the present invention, favoring preferential flow of heat; die punch member 20 is formed of a nickel alloy usually with copper. A nickel copper alloy of 66% nickel and 28% copper produced by Huntington Alloys is particularly useful and utilitarian. AMPCO 945, a copper nickel alloy has also been used to fabricate the die punch member 20 with good results in terms of rapid heat conductivity. Reference to FIGS. 2 and 4 also reveal the considerable mass/bulk of the die punch member 20 created by the generous cross section and including the annular flange 24. The mass/bulk character also extends downwardly through the aperture 39 in chamber 30, to the cutting edge 26 formed in the lower end of die punch 20. The bulk/mass/generous cross section feature favors the desired property of the die punch member 20 in acting as a heat sink creating a most convenient and favored path for the heat to move axially in the direction of the operative die cutting edge 26. It is a further advantage, in accordance with the present invention, that the flange 24 is hexagonal in section, as shown in FIG. 3, which results in a plurality of annular voids 61 (FIG. 3) between the die punch 20 and the member 30, which is of uniform size by reason of the concentricity provided by structure above at upper end of heater e.g. the isolator ring 50 and associated parts. The annular voids 61 extend almost the length of the die punch above the flange 24 and serves as insulating and isolating regions which inhibit flow of heat radially across the air space regions to the surrounding chamber 30. In similar fashion the chamber 30 is hexagonal in cross section, as shown both in FIG. 3 and FIG. 4. Clearly the mounting of the member 11, having an outer hexagonal periphery, in the cylindrical bore of crimper bar 74 in the manner shown in FIG. 7, will leave insulative air spaces or voids between the flat surfaces of the hexagonal outer surface of the chamber 30 and the inner cylindrical surface, of the bore in the structure (the crimper bar 74) in which mounted. In other words the only line of contact with the mounting structure e.g. crimper bar will be at the apices 62 of the hexagonal contour of the member 30, identified by the reference numeral 62 (FIG. 4). By reason of the hexagonal structure of the die punch flange 24 and the hexagonal structure of the chamber 30, there are created a plurality of such voids which inhibit conduction of heat laterally along the crimper bar as otherwise damages or interferes with the packaging operation in a manner to be described.

Referring now to FIGS. 6 and 7 there is shown a portion of a packaging line in which the heated die punch member 11 (FIG. 7) of the invention 1 is utilized. A sequence of articles 70 to be packaged are enclosed in a plastic wrap 76 and carried horizontally on a conveyor belt 71 between a pair of counter rotating arms 72, 73 moving oppositely in the direction indicated by the arrows. Arm 72 has mounted thereon a crimper bar 74, and arm 73 has mounted thereon crimper bar 75. Another set of crimper bars (not shown) can be carried oppositely on the respective arms 72, 73. The articles 70 encased in the plastic 76 proceed continuously in the direction indicated by the arrow 70a, between the rotating Crimper bars 74 and 75 and specifically pass between crimping surfaces 77 and 78 having serrations therein which impart the crimp design 79 (FIG. 5) in the trailing end of the leading package (which has proceeded past the crimping bar station) and the package behind it. At the same time, a cutting bar 79 in crimper bar 74 and an opposed anvil plate 80 in bar 75 (FIG. 7) sever the "leading" package from the "trailing" package in the manner indicated.

In accordance with the invention, the heated die punch member 11 is mounted in the upper crimper bar 74 as shown in FIG. 7. In accordance with a preferred embodiment of the present invention; the other crimper bar 75 contains a recess 80, just opposite the heated die punch, containing a screw 81, the upper head, 82 of which projects upwardly, as shown, and in registration with the cutting die end 26 of the die punch 20, as it severs the plastic sheet 76 in a circular pattern, but incomplete as shown in FIG. 5, by reason of the cut out or notch 25 (FIG. 2). The upwardly projecting head 82 supports the portion of sheet cut by the die as the latter projects downwardly to engage and penetrate the plastic sheet in the header region and thereby markedly improves the severing action. The notch 25 leaves a connecting bridge 83a connecting tab 83 (FIG. 5) with the remainder of the package. The portion of the package shown in FIG. 5 is the top or "header". The tab 83 is retained as a part of the package to avoid a house cleaning problem otherwise presented by the large plurality of the same if they were completely severed from the package during the crimping, hole punching and package severing operation. The tab 83 is desireably oriented so that the connector or bridge 83a is opposite the severing knife blade cut in order that the hanger spindle will engage the hole periphery and not the connector or bridge 83a as might otherwise interfere with proper hanging of the package on the spindle at the retail store. This orientation of the connector 83a is accomplished by the cooperative location of the pin recess 24b respecting the die cut out 25 which creates the hole and tab 83.

Reference numeral 85 (FIG. 6) identifies the housing containing the electronic components and the circuitry which make up the controller mechanism in accordance with a particular embodiment of the present invention.

The controller 85 is connected by suitable wiring 86 composed of the electrical wires 12, 13, 15 and 16 leading to thermocouple 14 and cartridge heater 17. They are encased in a surrounding sheath 18 (FIGS. 1 and 4) which is very insulative. Woven fiber glass is a suitable insulator and commercially available embedded in various heat stable polymeric materials to complete the sheath 18. The controller 85 includes an outer knob 87 controlling radial movement of a pointer (FIG. 8) which can be set at the temperature desired based upon a consideration of the nature of the particular sheet material being used, the size of the package, the needed temperature of the crimper bar and the desired production rate of the packages; all of which will have a bearing on the temperature setting needed to achieve the proper temperature of the cutting edge 25 of the die 20 appropriate to effective burning of the hole or aperture.

Reference may now be had to FIG. 8 for a schematic depiction/illustration of the components and circuitry of the temperature control device 85 in accordance with the present invention. The temperature control device 85 is composed of those items within the area enclosed by the dotted line 85a, consisting of a compensating amplifier 90, a comparator 91, a first adjustable pulse width timer 92, a second adjustable pulse width timer 93 and the relay 94, all electrically connected together as shown and to a source of electrical energy (125 volts) for the heater 17. As can be further seen, the thermocouple 14, which lies in the groove 17a of the cartridge heater 17 (FIGS. 2 and 4), is electricallly connected to the compensating amplifier 90, which in turn is connected to the comparator 91 and thence, in sequence, the adjustable pulse width timers 92 and 93, and thence the relay 94, which in turns connects a source of 115 volts to the heater 17. The heater 17 and thermocouple 14 are in contacting relationship, as in FIGS. 2 and 4 and situated telescopically within the die punch member 20 and in turn the hollow chamber 3. Reference numeral 95 identifies a rheostat, and adjustable temperature indicating dial 96 which can be manually set at any temperature via knob 87, usually from 200° F. to 800° F. The rheostat 95 is connected to the comparator 91 via conductor line 97. The code designation LTKAOI identifies a Commercially available compensating amplifier, at 90, which is desireably employed. Similarly the code number CA3059 appearing on the comparator 91 identifies a commercially available comparator which may be utilized. Also the designation NE 555 on the first and second adjustable pulse width timers 92 and 93 identifies a commercially available unit which can be used in the practice of the invention.

In operation; the thermocouple 14 senses or perceives the temperature of the heater 17 which is converted by the compensating amplifier 90 to a corresponding low voltage signal passing via line 90a to comparator 91. At the same time, the rheostat 95 converts the particular temperature value set on the dial 96, for example 600° F. to a low voltage signal transmitted via line 97 to the comparator 91. If the thermocouple 14 is also observing or perceiving 600° F. the comparator will determine that the signals transmitted via line 90a and 97 are the same and will not transmit a signal via line 91a to the first adjustable pulse width timer 92. Consequently no signal can pass to the second pulse timer 93 or to the relay 94. As a result the heater remains without energizing electricity. On the other hand, if the thermocouple 14 senses, for example, a temperature of 100° F., while the pointer on the dial 96 is set at 600° F.; the comparator 91 will sense the difference in the corresponding low voltage signals transmitted by the rheostat 95 and the compensating amplifier 90, and will transmit an "on" signal via line 91a to the first adjustable pulse width timer 92. This timer 92 is adjusted to be nominally in the "off" mode but switching to a brief "on" mode at spaced intervals of time B (see FIG. 9). The timer 92 transmits its momentary "on" signal to the pulse width timer 93 via line 92a. The second pulse width timer 93 having a preselected time value set therein by suitable manual adjustment will be "on" for a certain length of time depending upon the adjustment (see time interval line A in FIG. 9). If in the "on" position, the signal of a definite pulse width e.g. line A (FIG. 9) timer will be transmitted via line 93a to the relay 94. In fact, as often as the first adjustable pulse width timer is "on", repeated pulse signals (see A at FIG. 9) generated by the second pulse width timer will be passed on through line 93a to the relay 94. The relay 94 converts the low voltage signal to a plurality of pulse width signals of 115 volts and 250 watts which are transmitted incrementally via line 94a to the heater 17.

The foregoing components accordingly cooperatively serve to energize the electric resistance heater 17 with a repeating plurality of incremental pulse sequences of electricity which together serve to effect a gradual and controlled elevation of the temperature of the heater to that set on the dial 96 of the rheostat 95.

Referring now to FIG. 9, there is disclosed a diagrammatic representation of the "off/on" cycle in varying incremental timed sequence, as controlled or effected by the interfunctioning of the comparator 91 and the first and second pulse width timers 92 and 93; for the purpose of achieving an incremental rise in the temperature of the hole punch die 20 and a consistent maintaining of that temperature.

In FIG. 9 the passage of time is indicated on the abscissa or horizontal component of the drawing. Letter A represents the increment of time or pulse 121 e.g. the "on" signal achieved by manual adjustment of the second pulse width timer 93. Lower horizontal line 120 represents the "off" mode. Letter C indenties a line representing the increment of time or pulse of the "on" signal as determined by the comparator 91. Letter B identifies the the length of time during which the first pulse width timer 92 is effectively in the "off" position, or "off" mode, of the on/off cycle but punctucted by a very brief "on" position (see vertical line 130 which triggers the "on" mode of the second pulse width timer 93 adjusted to remain "on" for the time period A. Each of the pulse width timers can be manually adjusted to any particular value.

From the foregoing, it can be seen that the "on" signal 121 of time span A occurs 3 times (proceeding from left to right) as controlled by the time sequence manually set in the first pulse width timer 92 e.g. the length "B" and at the same time, the comparator 91 is in the "on" mode 111 for the total time span C (reference numeral 110 represents the "off" mode). As a consequence, in the time span C, three "on" cycle pulse signals proceed to the relay 94 where converted to three incremental pulses of 115 volts/250 watt electrical energy passing via line 94a to energize the heater 17 to incrementatily raise the temperature upwardly towards the value set in the dial 96. It can be noted that, at the end of segment C, the comparator switches to an "off" cycle at 110. As a result the theoretical fourth pulse 122 is shown in dotted outline to *signify that no current will flow while the comparator is in the "off" mode. Thereafter the reference numerial 123 signifies that the comparator 91 has sensed a difference between the lower voltage signal from the thermocouple 14 and the low voltage signal from the rheostat 95 (desired temperature set on the dial 96) and turns to an "on" mode. Simultaneously the fifth pulse 123 (of the second pulse width timer 93) coincides with the "on" blip signal of the first pulse width timer 92 (another time span B). Consequently an "on" signal is transmitted to the relay 94 for conversion to another pulse signal or time span of 115 volt/250 watt power to the heater 17 and thereby accomplishing another incremental elevation of the temperature. The interrelationship and coincidence of "on/off" cycles of the comparator 91 and the two adjustable pulse width timers 92 and 93 thus permit achievement of incremental heating in sequence determined, by first, the temperature differential between the thermocouple 14 and the dial setting 96, and secondly, the manual adjustment of the first and second pulse width timers, which together establish a timed sequence of timed, pulse "on" signals converted by the relay 94 to energization, in corresponding incremental fashion, of the heater 17. Thus the interfunctioning of these components, coupled with the manual adjustments, provide a system for achieving flexible heat control which is adaptable to the particular packaging and hole burning requirements, coupled with production rate, as, in composite (or in concert), will achieve a consistent maintenance of a desired temperature at the die end of the heater with overshooting and undershooting of the desired temperature reduced to a minimum.

As a consequence of the foregoing the quality and strength of the hole in the package is higher than achieveable by other combinations of heater control and die punch presently available. Additionally the cartridge heater itself, operating in accordance with the principle features of construction etc. of the present invention, as herein described, enjoys/possesses a life expectancy measured in multiple months rather than hours or days as with combinations presently available.

This controlled approach by the interfunctioning of the components making up the controller device, in accordance with the invention, compensates for the lag encountered in temperature flow, conduction and cooling. Thus, as indicated earlier herein, as a factual matter, even manual control of the current flow to the heater does not avoid the time lag problem. Thus experience finds manual control leading to overheating beyond that desired because of the inability of an individual to turn the current off in timely fashion. Attempts at using available temperature controllers was not successful. As a consequence the heater element is heated beyound the temperature desired then cooled to a temperature below that desired and then heated to a temperature above that desired in a repeating cycle. The latter cycle is found to critically shorten the life expectency of the heater element. In actual practice, heater cartridges have enjoyed a life expectancy measured in hours and days. In contrast the combination of the die punch construction 11, in accordance with the present invention, as described herein, and the heat control device composed of the components, as described herein, have yielded cartridge heaters lasting for a time measured in weeks and/or months, and as many as 6 months without thermal failure of the heater due to burnout. The long life is believed properly attributable, at least in part, to the incremental heating achieveable by the heat control system in accordance with the present invention. Not only does the use of the pulse width timer achieve an incremental "on" signal but that "on" signal transmission to the heater is further dependent upon two other factors. First, the difference between the actual temperature of the thermocouple 14 and the temperature desired as set on dial 96 (as determined by the comparator) and, secondly, the value preset in the other pulse width timer. The latter actually limits the frequency of the incremental pulse set by the pulse width timer. Together the foregoing operate to achieve the desired control of the heat spiral upward and its consistency at the particular temperature when achieved.

The control of temperature in various processes is usually achieved by a simple "on/off" control switch in combination with a thermocouple, but such is unacceptable in the packaging described herein due to heater burn out and unsatisfactory crimp seals.

Another type of controller is known as a proportional controller which usually has "on/off" cycles but additionally within a certain band, the time of the "on/off" cycle will vary in proportion to the temperature difference between actual and that desired. The proportional control, while reducing the cycling associated with on/off control, is not found as desireable as the heat control device in accordance with the present invention. A third type of heat control device is known, in the art, as a PID. The latter is a modified proportional control, plus integral, plus a derivative control mode. The PID controller is a three mode controller capable of exceptional control when properly tuned and used. It is deemed as a suitable controller device or system for use in the practice of the present invention.

It is to be understood that the use of the heated die punch is not limited to the type of crimper bar movement illustrated in FIGS. 6 and 7. Different packaging lines employ a vertical movement, usually for filling fungible goods. Packaging lines can also employ reciprocating intermittant motion crimper bars which may be either vertical or horizontal.

The component parts/elements of the die punch construction in accordance with the present invention are understandably fabricated of relatively high performance materials considering the environment in which employed, and particularly considering the production requirements of the competitive packaging industry. Thus production rates in the neighborhood of 40-80 packages per minute are reasonably conventional. This production rate and the elevated temperatures involved put a considerable burden upon these die punch assemblies and component parts. Optimum performance is achieved when the die punch member 20, containing the cartridge heater 17, and defining the cutting edge 26 of the die is formed of a nickel alloy usually inclusive of copper. The sleeve/chamber member 30 and the end cap piece 40 are desireably formed of stainless steel. The Bellville spring washers 55 and 56 and the isolator ring 50 are also most desireably formed of stainless steel. The cartridge heater 17 employed in the development work leading to the present invention was a commercial heater manufactured and marketed by the Dalton Company, Inc. of Ipswitch, Mass.

The die punch construction in accordance with the present invention can be fabricated of components which when assembled, will yield an assembly of about 1¾ inches in length.

In delineating the parameters of the present invention, the die punch assembly 11 employed measured about 1¾ inch in length and about ⅝ inches in overall outside diamenter. The heat transmission characterestics of the die punch construction 11 in accordance with the present invention constitutes one of its most important features. Thus while elevated temperatures are desireable and necessary, these variant temperatures can frequently, and usually do, lead to self destruction or burn out of the cartridge heater, both by reason of the temperature itself and the cycling of the temperature usually encountered with die punch constructions known heretofore. As previously indicated, the life expectancy of most commercially available cartridge heaters in the environment as herein described has been frequently measured in hours and sometimes less than a day. Obviously a packaging line, otherwise designed to achieve a production rate of 40-80 packages per minute is not well served when the cartridge heater must be replaced frequently.

With the construction of the present invention, however, the life expectancy of the heater cartridge is measured in months, and, in some cases, a life expectancy approaching six months has been achieved even at the elevated temperatures of 800° F. Consequently production capacity is maximized and labor cost minimized.

As indicated, this is attributed to the novel features of construction at the present invention as enumerated above and repeated for emphasis.

The design and compositions of the die punch member 11 and its components is unique in that such provide a rapid conduction capability measured from the interiorly nested cartridge heater 17 to the tip 26 of the cutting edge of the die 20. The desired focusing of the heat is encouraged by the mass of the metal in the region of the cutter edge, and, additionally, by the surrounding and insulative annular pockets of air between the die punch 20 and the surrounding chamber 30 created by the polygonal flange which creates the insulating air chamber. The outer polygonal contour of the chamber 30, also provides an additional series of surrounding insulative air chambers as mounted in the cylindercial bore in the face 77 of the upper crimping bar 74.

It is also found that the stainless steel construction of the outer sleeve 40 does not transmit the heat as well as the nickel/copper alloy of which the die punch 20 itself is made. Thus the double air insulation/isolation and the appropriate materials of construction favor the focusing of the heat in the most desireable manner which is away from the cartridge heater and axially toward the cutting edge. And, of course, the temperature control device in accordance with the present provide ainvention coacts and cooperates with the factors hereinabove discussed to gradual rise in the temperature to that value desired as manually set on the dial. The features of circuitry of the control are found to essentially eliminate overshooting and undershooting of the precise temperature desired.

Additionally the above features cooperate to yield a preciseness of temperature within a degree or so of that desired.

Thus all of the foregoing features cooperate to avoid thermal shock as usually encountered in this particular application. The combination of features also favorably address what is frequently referred to as the temperature lag phenomenon. The lag phenomenon is the time increment that is inherent in the conduction of heat from one point to the other, and, additionally, in the delay inherent in measurement of the temperature; all in recognition that the ultimate temperature desired is that of the die punch cutting edge 25, whereas the thermocouple 14 is located along side the cartridge heater 17 as shown in the drawings and discussed hereinabove.

In summary the combination of constructional features and the combination of circuitry features coact to yield the die punch device of the present invention, which is possessed of thermal properties markedly superior to any units presently available in the art and/or in industry.

The foregoing description will suggest a variety of modifications and substitutions that may be logically and easily resorted to by those skilled in the art without departing from the spirit and scope of the present invention as setforth herein and the accompanying drawings. It is intended however that all such modifications, substitutions and the like, including even departures from the explicit description herein, shall be included within the scope of the present invention, unless to so do would do violence to the language of the appended claims.

We claim:

1. A die-punch assembly construction comprising;

a first, hollow, elongate, tube-like member having one open end adapted to slidably and nestably receive an electric resistance cartridge heater and an opposite closed end having a die formed on the lower exterior thereof, a second, hollow, elongate sleeve-like member essentially surrounding said first member with minimum contact and having opposed open ends, one lower end allowing the die exterior of said first member to project axially therethrough, a caplike closure engaging and closing said otherwise open upper end of said second member, means adapted to center said first member axially respecting said second member and to urge said die exteriorly, and means defining air insulation voids surrounding said first tube like member.

2. The invention is claimed in claim 1, wherein the said second member, defines, for at least a portion of its length, in section, a polygon, having apices for slideable contact with a surrounding bore of a crimper bar in which mounted.

3. The invention is claimed in claim 2, wherein said first member includes an outer surface which, viewing said first member in section, defines a polygon, having apices for slideable contact with said second member.

4. The invention is claimed in claim 1, wherein said first member includes an outer surface which, viewing said first member in section, defines a polygon, having apices for slideable contact with said second member.

5. The invention is claimed in claim 1, wherein said means urging said die exteriorally comprises, a pair of Belleville spring washers in concentric contacting relationship, and urged into compression by said caplike closure.

6. The invention is claimed in claim 5 wherein said means urging the die exteriorally further includes an annular isolator ring positioned axially within said second member, being in contact with the end of said first member opposite said die and being adapted to slidably encircle a cartridge heater and providing concentric relationship of said components.

7. The invention is claimed in claim 5 wherein said second member includes a cylinderical region having an annular recess spaced from the end proximate said caplike closure piece, and said caplike closure includes an annular skirt portion having an annular projection on the inner surface thereof, adapted for snap engagement within said annular recess in said second member, to thereby lock said assembly together with said Belleville springs in a state of compression.

8. The invention is claimed in claim 7 wherein said second member has spaced parallel slots formed in the cylindrical end proximate said caplike closure, lending compressive flexibility to assist snap engagement of said end piece therewith.

9. The invention is claimed in claim 1 wherein said first member is formed of a nickel containing highly heat conductive metal alloy.

10. The invention is claimed in claim 9 wherein said second member and caplike closure are formed of stainless steel.

11. In combination, the die punch construction as claimed in claim 1 and an electric resistance cartridge heater, located telescopically within said first member.

12. The invention as claimed in claim 1 which includes means for creating a static insulative air space between said first and second member.

13. The invention as claimed in claim 12 which includes means for creating a static insulative air space surrounding said second member.

14. The invention as claimed in claim 9 wherein said conductive metal is copper, 15. The invention as claimed in claim 14 wherein said conductive metal includes nickel.

16. The invention as claimed in claim 15 wherein said first hollow member contains an electric resistance cartridge heater.

17. The invention as claimed in claim 16 which includes a silver solder composition between said first hollow member and said electric resistance cartridge heater.

18. In combination, the die punch construction, as claimed in claim 1, an electric resistance cartridge heater, located telescopically within said first member, and a control device for achieving a pre selected, incrementally timed frequency of current flow to said electric resistance heater, responsive to the temperature setting of a rheostat member having a low voltage output corresponding in value to the temperature setting, said control device comprising the following components connected together electrically;

a thermocouple having its sensor probe positioned in close proximity to the electric heater;

a compensating amplifier;

a comparator;

a first adjustable pulse width timer;

a second adjustable pulse width timer:

a relay adapted to convert said incrementally timed flow of low voltage into a corresponding 110 volt/250 watt current flow directed to the electric resistance heater; and said electric resistance cartridge heater, said compensating amplifier comprising means for converting the temperature perceived by said thermocouple to a corresponding low voltage signal for transmission to said comparator;

said comparator including means for comparing said rheostat voltage output with the compensating amplifier voltage output and transmitting said low voltage signal to the first adjustable pulse width timer, if said rheostat voltage is higher;

said first pulse width timer being adapted to transmit said signal for a given preselected adjustable period of time to said second pulse width timer adapted to transmit said voltage signal to said relay for a preselected adjustable period of time;

said flow of current passing to said relay, in preselected time increments as determined by the second pulse width timer, and thence converted to corresponding incremental time flow sequences of electric current sufficient to energize said heater, said flow proceeding incrementally to said electric resistance heater wherein said current is converted to heat which rises incrementally as determined by the aforesaid interfunctioning of the comparator and the adjustable pulse width timers;

whereby the electric resistance heater does not over heat; but rather the temperature gradually increases and consistently maintains that temperature as manually set on the said rheostat control.

19. The combination of, the die punch construction as claimed in claim 1, an electric resistance cartridge heater located telescopically within said first member, a crimper bar having a crimp forming surface adapted to crimp seal a plurality of packages comprising a product and its' surrounding sheet plastic wrap and means for mounting said die punch in said crimper bar, whereby the presence of the die punch of claim 1 yields an improved, more consistent seal.

20. The invention, as claimed in 19, which includes a control device for achieving a preselected incrementally timed frequency of current flow to said electric resistance heater, responsive to the temperature setting of a rheostat member having a low voltage output corresponding in value to the temperature setting, comprising the following components connected together electrically,

- a thermocouple having its sensor probe positioned in close proximity to the electric heater;
- a compensating amplifier;
- a comparator;
- a first adjustable pulse width timer;
- a second adjustable pulse width timer;
- a relay adapted to convert said incrementally timed flow of low voltage into a corresponding 110 volt/250 watt current flow directed to the electric resistance heater; and
- said electric resistance: cartridge heater,
- said compensating amplifier comprising means for converting the temperature perceived by said thermocouple to a corresponding low voltage signal for transmission to said comparator;
- said comparator including means for comparing said rheostat voltage output with the compensating amplifier voltage output and transmitting said low voltage signal to the first adjustable pulse width timer, if said rheostat voltage is higher;
- said first pulse width timer being adapted to transmit said signal for a given preselected adjustable period of time to said second pulse width timer adapted to transmit said voltage signal to said relay for a preselected adjustable period of time:
- said flow of current passing to said relay, in preselected time increments as determined by the second pulse width timer and thence converted to corresponding incremental time flow sequences of electric current sufficient to energize said heater, said flow proceeding incrementally to said electric resistance heater, wherein said current is converted to heat which rises incrementally as determined by the aforesaid interfunctioning of the comparator and the adjustable pulse width timers:
- whereby the electric resistance heater does not over heat; but rather the temperature gradually increases and consistently maintains that temperature as manually set on the said rheostat control, and whereby the presence of said control device yields a longer lived, consistant seal.

21. In combination, the combination of claim 18 and a crimper bar having a crimp forming surface for crimp sealing a package comprising a product and its' surrounding plastic wrap.

* * * * *